US011726987B2

(12) United States Patent
Feijoo

(10) Patent No.: US 11,726,987 B2
(45) Date of Patent: *Aug. 15, 2023

(54) NORMALIZING USER IDENTIFICATION ACROSS DISPARATE SYSTEMS

(71) Applicant: Citrix Systems, Inc., Fort Lauderdale, FL (US)

(72) Inventor: Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 284 days.

This patent is subject to a terminal disclaimer.

(21) Appl. No.: 16/950,027

(22) Filed: Nov. 17, 2020

(65) Prior Publication Data
US 2021/0073210 A1   Mar. 11, 2021

Related U.S. Application Data

(63) Continuation of application No. 15/784,328, filed on Oct. 16, 2017, now Pat. No. 10,877,960.

(51) Int. Cl.
*G06F 16/23* (2019.01)
*G06F 16/27* (2019.01)
(Continued)

(52) U.S. Cl.
CPC ........ *G06F 16/2379* (2019.01); *G06F 16/215* (2019.01); *G06F 16/24573* (2019.01);
(Continued)

(58) Field of Classification Search
CPC ................. H04L 63/0815; G06F 21/45; G06F 16/215; G06F 16/955; G06F 16/27
(Continued)

(56) References Cited

U.S. PATENT DOCUMENTS 7,240,214 B2   7/2007 Gazzei et al.
7,965,707 B2   6/2011 Jones et al.
(Continued)

OTHER PUBLICATIONS

Feller, "Workspace Identity", Citrix Product Documentation, retrieved from https://docs.citrix.com/en-us/tech-zone/learn/tech-briefs/workspace-identity.html (Jul. 28, 2020).
(Continued)

*Primary Examiner* — Hosain T Alam
*Assistant Examiner* — Nicholas E Allen

(57) ABSTRACT

A technique involves normalizing identification of users (e.g., different customer organizations) across disparate local systems (e.g., different electronic platforms that provide different products and/or services). Such normalization of user identification enables a provider to accurately ascertain a particular user of multiple disparate local systems even when the multiple disparate local systems identify that user using different identification schemes. Accordingly, the provider is able to offer enhanced support to that user across the multiple disparate local systems. For example, with such normalization of user identification, the provider may employ a single authentication system across the various local systems thus enabling the user to authenticate via the same authentication process regardless of which local system the user attempts to access. As another example, the provider may collect data among the disparate local systems and apply analytics to identify optimization opportunities for the user that could not be otherwise be conveniently determined.

20 Claims, 7 Drawing Sheets

(51) Int. Cl.
  *G06F 16/955* (2019.01)
  *G06F 16/2457* (2019.01)
  *G06F 21/45* (2013.01)
  *G06F 16/215* (2019.01)
  *H04L 9/40* (2022.01)

(52) U.S. Cl.
  CPC ............ *G06F 16/27* (2019.01); *G06F 16/955* (2019.01); *G06F 21/45* (2013.01); *H04L 63/0815* (2013.01)

(58) Field of Classification Search
  USPC .......................................................... 707/623
  See application file for complete search history.

(56) References Cited

U.S. PATENT DOCUMENTS

| | | | |
|---|---|---|---|
| 8,060,560 | B2 | 11/2011 | Vonog et al. |
| 8,190,556 | B2 | 5/2012 | Pappas |
| 8,306,986 | B2 * | 11/2012 | Routson ............... G06F 16/211 707/749 |
| 8,429,204 | B2 | 4/2013 | Qian et al. |
| 8,738,764 | B1 * | 5/2014 | Schepis ............... G06F 21/6218 709/224 |
| 8,744,995 | B1 * | 6/2014 | Hewinson ............. G06F 16/313 707/603 |
| 8,959,141 | B2 | 2/2015 | Vonog et al. |
| 9,058,380 | B2 | 6/2015 | Lesiecki et al. |
| 9,069,979 | B2 * | 6/2015 | Srinivasan ............ G06F 21/62 |
| 9,104,858 | B1 * | 8/2015 | Sundaram ............ H04L 63/083 |
| 9,424,554 | B2 | 8/2016 | Hayton et al. |
| 9,471,331 | B2 | 10/2016 | Kludy et al. |
| 9,774,586 | B1 * | 9/2017 | Roche ..................... H04L 63/08 |
| 9,906,461 | B2 | 2/2018 | Kludy et al. |
| 2007/0192122 | A1 * | 8/2007 | Routson ............... G06F 16/211 705/325 |
| 2009/0210435 | A1 * | 8/2009 | Akiyama ............. G06F 16/211 |
| 2013/0318593 | A1 | 11/2013 | Smith et al. |
| 2014/0046777 | A1 * | 2/2014 | Markey ................ G06Q 30/02 705/14.66 |
| 2014/0075501 | A1 * | 3/2014 | Srinivasan ............. H04L 63/08 726/1 |
| 2014/0123211 | A1 * | 5/2014 | Wanser ................. H04L 41/20 726/1 |
| 2014/0143211 | A1 * | 5/2014 | Baker ................. H04L 41/0856 707/691 |
| 2014/0279201 | A1 * | 9/2014 | Lyoob ................... G06F 9/5077 705/26.7 |
| 2014/0280261 | A1 * | 9/2014 | Butler ................ G06F 21/6245 707/756 |
| 2015/0074758 | A1 * | 3/2015 | Zhou ....................... H04W 4/60 707/769 |
| 2015/0188927 | A1 * | 7/2015 | Santhi ................ G06Q 10/0631 726/4 |
| 2015/0242520 | A1 * | 8/2015 | Li ....................... G06F 21/6218 707/770 |
| 2016/0019636 | A1 * | 1/2016 | Adapalli ................ H04L 47/70 705/26.81 |
| 2016/0048538 | A1 * | 2/2016 | Zhang ................... G06F 16/211 707/803 |
| 2016/0048698 | A1 * | 2/2016 | Sahu ................ G06F 16/90335 707/783 |
| 2016/0112872 | A1 * | 4/2016 | McClement .......... H04W 12/06 455/411 |
| 2016/0125405 | A1 * | 5/2016 | Alterman ............... G06Q 20/40 705/44 |
| 2016/0134616 | A1 | 5/2016 | Koushik et al. |
| 2017/0076286 | A1 * | 3/2017 | Castinado ................ H04L 9/50 |
| 2017/0264640 | A1 * | 9/2017 | Narayanaswamy ........................ H04L 63/0281 |
| 2018/0159856 | A1 | 6/2018 | Gujarathi |
| 2019/0058706 | A1 | 2/2019 | Feijoo et al. |

OTHER PUBLICATIONS

U.S. Appl. No. 17/113,874, filed Dec. 7, 2020 (55 pages).

\* cited by examiner

NORMALIZING USER IDENTIFICATION ACROSS DISPARATE SYSTEMS

BACKGROUND

Conventional cloud platforms provide cloud services to customer entities over a public network. Example cloud services include remote email access, online data storage and backups, access to hosted office applications, and web services, among others.

To manage customer access, a conventional cloud platform may maintain a customer database. That is, the conventional cloud platform assigns, to each customer entity, a respective key that uniquely identifies that customer entity among the other customer entities that also access the same conventional cloud platform, e.g., key M to uniquely identify Company M, key N to uniquely identify Company N, and so on.

SUMMARY

It should be understood that there are deficiencies to the above-described conventional cloud platform that simply maintains a customer database to manage customer access. Along these lines, suppose that a particular cloud service provider separately deploys different conventional cloud platforms to provide different specialized cloud services to the same customer entity. For example, the cloud service provider may deploy a first conventional cloud platform that provides email access to Customer P, a second conventional cloud platform that provides online data storage to Customer P, and so on.

In such a situation, each conventional cloud platform maintains a separate customer database even though it may be advantageous for the different cloud platforms to access the same customer information of Customer P. However, the ability for one cloud platform to access customer information from another cloud platform may be an overly-complicated and arduous endeavor due to differences in customer database format, incompatibilities and/or specialized features among the different customer databases, inconsistencies in access protocols, and so on.

Alternatively, each platform could be redesigned to use common keys that locally identify each customer across all platforms. However, such an endeavor would be complex, expensive, and extremely difficult to coordinate and implement.

In contrast to the above-described conventional cloud platforms that simply maintain customer databases to manage customer access, improved techniques are directed to normalizing identification of users (e.g., different customer organizations) across disparate local systems (e.g., different electronic platforms that provide different products and/or services). Such normalization of user identification enables a provider to accurately ascertain a particular user of multiple disparate local systems even when the multiple disparate local systems identify the user via different identification schemes. Accordingly, the provider is able to offer improved support to that user across the multiple disparate local systems. For example, with such normalization of user identification, the provider may employ a single authentication system across the various local systems thus enabling users to authenticate via the same authentication process regardless of which local systems the users attempt to access. As another example, the provider may collect user data among the disparate local systems and apply analytics to identify optimization opportunities for the users that could not be otherwise be conveniently determined.

One embodiment is directed to a method of normalizing user identification across disparate local systems. The method includes, based on creation of a user account on a local system that enables a particular user to use the local system, electronically receiving a user creation message at a central system and from the local system. The user creation message has a set of aliases which includes a particular alias that is based on a particular local user identifier that uniquely identifies the particular user to the local system. The method further includes, on a set of databases of the central system, electronically performing an alias recognition operation that attempts to recognize each alias of the set of aliases of the user creation message. The set of databases includes (i) a master user database having master user entries which match users of the disparate local systems to master user identifiers that uniquely identify the users to the central system and (ii) an alias database having alias entries which match aliases to the master user identifiers, the aliases being based on local user identifiers that uniquely identify the users to the disparate local systems. The alias recognition operation provides an alias recognition result identifying any alias of the set of aliases of the user creation message that is recognized by the central system. The method further includes electronically performing an update operation on the set of databases based on the alias recognition result, the update operation updating the set of databases so that the central system is operative to identify the particular user based on each alias of the set of aliases of the user creation message. Such user identification normalization enables information from different local systems to be properly associated with the same user even if the user is identified by each local system via a different identification technique.

In some arrangements, electronically receiving the user creation message includes obtaining, as part of the user creation message, a particular user description that describes the particular user. In such arrangements, when electronically performing the update operation on the set of databases, the central system is operative to:

(A) when the alias recognition result identifies no alias of the set of aliases of the user creation message as being recognized by the central system, perform a new user operation that (i) adds a new master user entry to the master user database, the new master user entry matching a new master user identifier to the particular user description that describes the particular user and (ii) adds a set of new alias entries to the alias database, the set of new alias entries matching each alias of the set of aliases of the user creation message to the new master user identifier, and (B) when the alias recognition result identifies an alias of the set of aliases of the user creation message as being recognized by the central system, perform an existing user operation that (i) retrieves an existing master user identifier from an existing alias entry of the alias database based on the alias of the set of aliases of the user creation message that is recognized by the central system, and (ii) adds a set of new alias entries to the alias database, the set of new alias entries matching each unrecognized alias of the set of aliases of the user creation message to the existing master user identifier retrieved from the existing alias entry.

In some arrangements, electronically receiving the user creation message further includes obtaining, as each alias of the set of aliases of the user creation message, (i) a local system identifier which uniquely identifies one of the disparate local systems and (ii) a respective local user identifier which uniquely identifies the particular user to that one of the disparate local systems.

In some arrangements, electronically performing the update operation on the set of databases includes, in response to the alias recognition result identifying no alias of the set of aliases of the user creation message as being recognized by the central system, (i) adding the new master user entry to the master user database, the new master user entry matching the new master user identifier to the particular user description that describes the particular user and (ii) adding the set of new alias entries to the alias database, the set of new alias entries matching each alias of the set of aliases of the user creation message to the new master user identifier. In these arrangements, (i) the local user identifiers are generated by the disparate local systems and separately (ii) the new master user identifier is generated by the central system.

In some arrangements, the set of aliases of the user creation message includes exactly one alias, the exactly one alias being the particular alias and having (i) a local system identifier which uniquely identifies the local system among the disparate local systems and (ii) the particular local user identifier that uniquely identifies the particular user to the local system. In these arrangements, adding the set of new alias entries to the alias database includes, based on the exactly one alias, creating exactly one new entry in the alias database, the exactly one new entry matching the exactly one alias to the new master user identifier that is generated by the central system.

In some arrangements, electronically performing the update operation on the set of databases includes, in response to the alias recognition result identifying an alias of the set of aliases of the user creation message as being recognized by the central system:
  (i) retrieving an existing master user identifier from an existing alias entry of the alias database based on the alias of the set of aliases of the user creation message that is recognized by the central system, and
  (ii) adding a set of new alias entries to the alias database, the set of new alias entries matching each unrecognized alias of the set of aliases of the user creation message to the existing master user identifier retrieved from the existing alias entry.

In these arrangements, (i) the local user identifiers may be generated by the disparate local systems and separately (ii) the existing master user identifier may be generated by the central system.

In some arrangements, the set of aliases of the user creation message includes the particular alias and another alias. Along these lines, the particular alias has (i) a local system identifier which uniquely identifies the local system among the disparate local systems and (ii) the particular local user identifier that uniquely identifies the particular user to the local system. Additionally, the other alias is the alias of the set of aliases of the user creation message as being recognized by the central system and has (i) another local system identifier which uniquely identifies another local system among the disparate local systems and (ii) the another local user identifier that uniquely identifies the particular user to the other local system, the other local user identifier being different from the particular local user identifier. Furthermore, adding the set of new alias entries to the alias database includes, based on the other alias, creating a new entry in the alias database, the new entry matching the particular alias to the new master user identifier that is generated by the central system.

In some arrangements, the user is an organization (e.g., a company, a corporation, a particular group of human users, etc.) that utilizes a sets of services provided by the disparate local systems. Each disparate local system is operative to provide a different service to the organization.

In some arrangements, prior to electronically performing the update operation, the central system prevented human workers belonging to the organization from using the local system due to improper authentication but allowed the human workers belonging to the organization to use another local system of the disparate local systems due to proper authentication. In these arrangements, the method further includes, based on electronically performing the update operation, allowing the human workers belonging to the organization to use the local system due to proper authentication.

In some arrangements, the method further includes collecting usage data from each of the disparate local systems, the usage data identifying activities performed by the disparate local systems on behalf of the users. Additionally, the method includes, based on the usage data collected from each of the disparate local systems, deriving a set of optimizations to perform on the disparate local systems.

In some arrangements, the usage data includes particular data that identifies activities performed by another local system of the disparate local systems. In these arrangements, the method further includes automatically adjusting operation of the local system based on the particular data that identifies activities performed by the other local system of the disparate local systems.

In some arrangements, the users are different organizations that utilize respective sets of cloud services provided by the disparate local systems. Each disparate local system is operative to provide a different cloud service to the different organizations.

Another embodiment is directed to a computer program product having a non-transitory computer readable medium that stores a set of instructions to normalize user identification across disparate local systems. The set of instructions, when carried out by computerized circuitry, causes the computerized circuitry to perform a method of:
  (A) based on creation of a user account on a local system that enables a particular user to use the local system, electronically receiving a user creation message at a central system and from the local system, the user creation message having a set of aliases which includes a particular alias that is based on a particular local user identifier that uniquely identifies the particular user to the local system;
  (B) on a set of databases of the central system, electronically performing an alias recognition operation that attempts to recognize each alias of the set of aliases of the user creation message, the set of databases including (i) a master user database having master user entries which match users of the disparate local systems to master user identifiers that uniquely identify the users to the central system and (ii) an alias database having alias entries which match aliases to the master user identifiers, the aliases being based on local user identifiers that uniquely identify the users to the disparate local systems, the alias recognition operation providing an alias recognition result identifying any alias of the set of aliases of the user creation message that is recognized by the central system; and
  (C) electronically performing an update operation on the set of databases based on the alias recognition result, the update operation updating the set of databases so that the central system is operative to identify the particular user based on each alias of the set of aliases of the user creation message.

Yet another embodiment is directed to an electronic apparatus that normalizes user identification across disparate local systems. The electronic apparatus includes a communications interface, memory, and control circuitry coupled to the communications interface and the memory. The memory stores instructions that, when carried out by the control circuitry, cause the control circuitry to:

(A) based on creation of a user account on a local system that enables a particular user to use the local system, electronically receive a user creation message at a central system and from the local system through the communications interface, the user creation message having a set of aliases which includes a particular alias that is based on a particular local user identifier that uniquely identifies the particular user to the local system, (B) on a set of databases of the central system, electronically perform an alias recognition operation that attempts to recognize each alias of the set of aliases of the user creation message, the set of databases including (i) a master user database having master user entries which match users of the disparate local systems to master user identifiers that uniquely identify the users to the central system and (ii) an alias database having alias entries which match aliases to the master user identifiers, the aliases being based on local user identifiers that uniquely identify the users to the disparate local systems, the alias recognition operation providing an alias recognition result identifying any alias of the set of aliases of the user creation message that is recognized by the central system, and (C) electronically perform an update operation on the set of databases based on the alias recognition result, the update operation updating the set of databases so that the central system is operative to identify the particular user based on each alias of the set of aliases of the user creation message.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in normalizing user identification across disparate local systems.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to normalizing identification of users (e.g., different customer organizations) across disparate local systems (e.g., different electronic platforms that provide different products and/or services). Such normalization of user identification enables providers to accurately ascertain particular users of disparate local systems even when the disparate local systems identify users using different identification schemes. Accordingly, the providers are able to offer enhanced support to users across multiple disparate local systems. For example, with such normalization of user identification, a provider may employ a single authentication system across various local systems thus enabling each user to authenticate via the same authentication process regardless of which local system that user attempts to access. As another example, the provider may collect user data among the disparate local systems and apply analytics to all of the user data to identify optimization opportunities for the users that could not be otherwise be conveniently determined from simply looking at data from just one local system.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
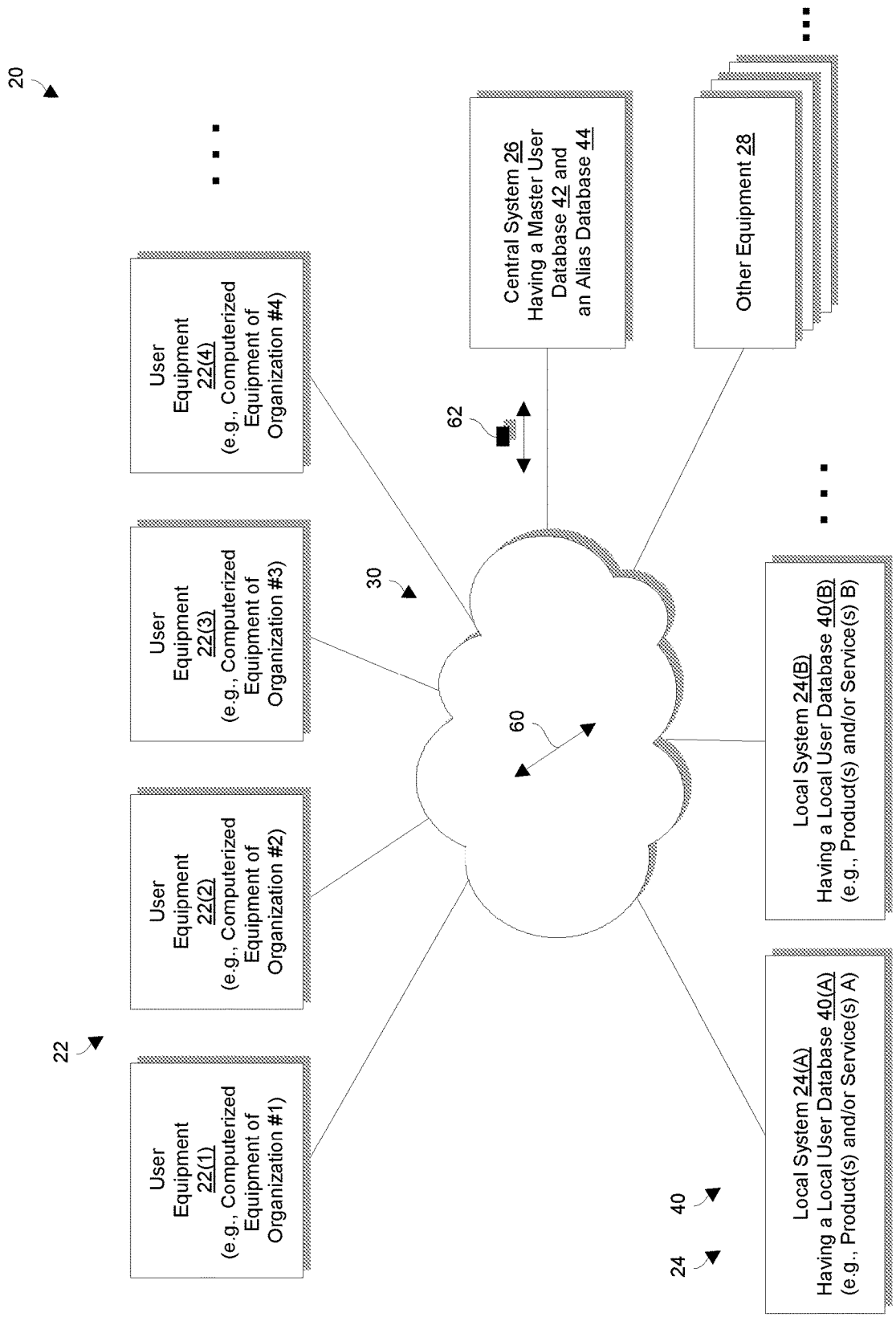
FIG. 1 is a block diagram of an electronic setting that normalizes user identification across local systems in accordance with certain embodiments.

FIG. 1 shows an electronic setting 20 that normalizes identification of users across local systems in accordance with certain embodiments. The electronic setting 20 includes user equipment 22(1), 22(2), 22(3), 22(4), . . . (collectively, user equipment 22), local systems 24(A), 24(B), . . . (collectively, local systems 24), a central system 26, other equipment 28, and a communications medium 30.

The user equipment 22, in accordance with some embodiments, is constructed and arranged to electronically access products and/or services that are provided by the local systems 24. Along these lines, the user equipment 22(1) represents electronic equipment of a first entity, the user equipment 22(2) represents electronic equipment of a second entity, and so on. Such user equipment 22 may reflect separate independent entities (e.g., different companies, corporations, customers, other types of organizations, etc.) having human operators (i.e., individuals) that operate one or more computerized devices to access the various local systems 24.

Each local system 24, in accordance with some embodiments, is constructed and arranged to provide one or more electronic products and/or services to the user equipment 22 (hereinafter, simply users 22). Suitable products and services include server, desktop and application virtualization, cloud and web-based infrastructure and services, as well as other cloud computing technologies, among others things (e.g., messaging, email, data processing, software as a service, platform as a service, infrastructure as a service, and so on).

It should be understood that each local system 24 may specialize in providing a different set of products and/or services, as well as maintain its own local user database 40 (or perhaps leverage use of a local user database 40 of another local system 24) to uniquely identify a respective set of users 22 that access that local system 24. By way of example only, the local system 24(A) provides product(s) and/or service(s) A and includes a local user database 40(A) to identify its respective users 22, the local system 24(B) provides product(s) and/or service(s) B and includes a local user database 40(B) to identify its respective users 22, and so on.

The central system 26, in accordance with some embodiments, is constructed and arranged to normalize user identification across the various local systems 24. As shown, the central system 26 includes a master user database 42 and an alias database 44 to uniquely identify the users 22 that access all of the local systems 24.

The other equipment 28, in accordance with some embodiments, is constructed and arranged to represent other apparatus of the electronic setting 20. For example, the other equipment 28 may include an authentication server to perform authentication on behalf of all of the local systems. As another example, the other equipment 28 may include one or more data repositories to detect and log user activity across multiple local systems 24 for the same user 22 and then identify optimizations as well as other big data analytics that may enhance operation for that user 22, and so on.

The communications medium 30, in accordance with some embodiments, is constructed and arranged to connect the various components of the electronic setting 20 together to enable these components to exchange electronic signals 60 (e.g., see the double arrow 60) for robust and reliable communications. At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, cellular communications, plain old telephone service (POTS) communications, combinations thereof, and so on.

During operation, the users 22 access the various local systems 24 to obtain products and/or services. To this end, each local system 24 is able to properly identify the users 22 based on local user identifiers that are maintained by a respective local user database 40 of that local system 24.

Additionally, the local systems 24 exchange messages 62 with the central system 26 enabling the central system 26 to normalize user identification among other operations. Along these lines and as will be explained in further detail shortly, the central system 26 evaluates aliases within certain user creation messages 62 from the local systems 24 to ascertain users 22 even though the local systems 24 may identify the users 22 via disparate techniques (e.g., via different local user identifiers, terminology, formats, protocols, combinations thereof, etc.). Further details will now be provided with reference to FIG. 2.

Figure 2:
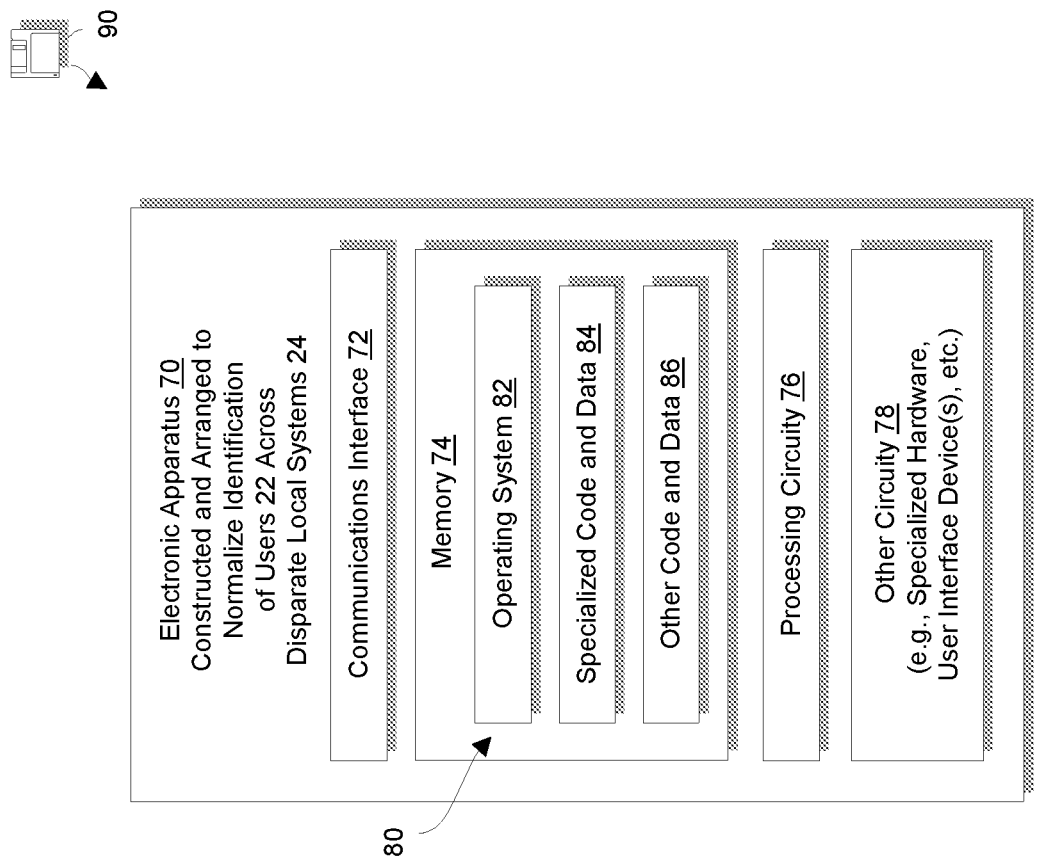
FIG. 2 is a block diagram of an electronic apparatus that is suitable for use in the electronic setting of FIG. 1.

FIG. 2 shows example details for an electronic apparatus 70 that is suitable for all or some of the circuitry of the central system 26 (also see FIG. 1). The electronic apparatus 70 includes a communications interface 72, memory 74, processing circuitry 76, and other circuitry 78.

The communications interface 72 is constructed and arranged to connect the electronic apparatus 70 to the communications medium 30 (FIG. 1). Accordingly, the communications interface 72 enables the electronic apparatus 70 to communicate with the other components of the electronic setting 20. Such communications may be cable-based and/or wireless (i.e., IP-based, cellular, combinations thereof, and so on).

The memory 74 is intended to represent both volatile storage (e.g., DRAM, SRAM, etc.) and non-volatile storage (e.g., flash memory, magnetic disk drives, etc.). The memory 74 stores a variety of software constructs 80 including an operating system 82, a set of specialized applications and data 84, and other applications and data 86.

The processing circuitry 76 is constructed and arranged to operate in accordance with the various software constructs 80 stored in the memory 74. In particular, the processing circuitry 76, when executing the operating system 82, manages various resources of the electronic apparatus 70 (e.g., memory allocation, processor cycles, etc.). Additionally, the processing circuitry 76 operating in accordance with the set of specialized applications and data 84 forms specialized control circuitry to normalize user identification across disparate local systems 24. Furthermore, the processing circuitry 76 operating in accordance with the other applications and data 86 forms other specialized circuitry to perform other operations, e.g., coordination with other devices such as the other equipment 28, etc.

The other circuitry 78 is constructed and arranged to perform other operations. For example, the additional circuitry 78 may include a user interface for user input/output, specialized computing engines, and so on.

It should be understood that the above-mentioned processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 70. The computer program product 90 has a non-transitory and non-volatile computer readable medium that stores a set of instructions to control one or more operations of the electronic apparatus 70. Examples of suitable computer readable storage media include tangible articles of manufacture and apparatus that store instructions in a non-volatile manner such as CD-ROM, flash memory, disk memory, tape memory, and the like. Further details will now be provided with reference to FIGS. 3 through 6.

FIGS. 3 through 6 provide examples of how various components of the electronic setting 20 operate and communicate with each other to achieve robust and reliable normalization of user identification. It should be understood that such normalization may be efficiently and effectively accomplished even if the local systems 24 individually employ different user identification techniques (e.g., where each local system 24 uses its own local user identifiers, where each local system 24 has different user contact information, etc.).

Figure 3:
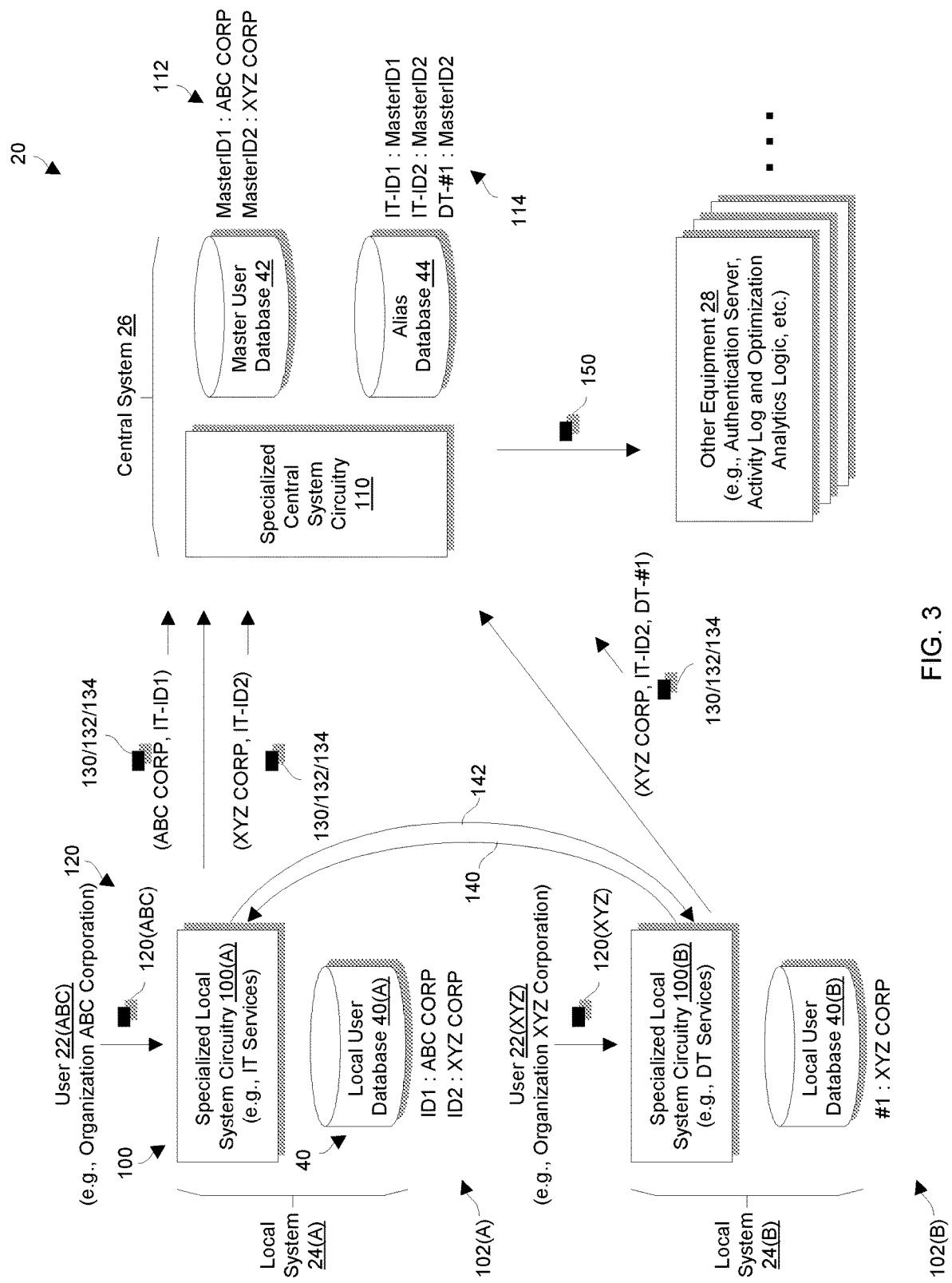
FIG. 3 is a block diagram illustrating a first normalization operation in accordance with certain embodiments.

As shown in FIG. 3, the local system 24(A) includes a local user database 40(A) and specialized local system circuitry 100(A). The local user database 40(A) is constructed and arranged to store user information that describes the users 22 that have access to the local system 24(A). In particular, the local user database 40(A) maintains local user entries 102(A) that match user descriptions containing detailed information about the users 22 to local user identifiers that uniquely identify the users 22 to the local system 24(A). The user description may include a variety of user descriptive data such as an organization name, an organization address, names of people within the organization, privileges, control parameters, and so on. The specialized local system circuitry 100(A) is constructed and arranged to access the local user database 40(A) to properly identify users 22 when providing products and/or services to those users 22.

As further shown in FIG. 3, the central system 26 includes a master user database 42, an alias database 44, and specialized central system circuitry 110. The master user database 42 stores master user entries 112 that match user descriptions describing the users 22 to master user identifiers that uniquely identify the users 22 to the central system 26. The alias database 44 stores alias entries 114 that match the master user identifiers to user aliases that are provided by the various local systems 24.

Also, as mentioned earlier in connection with FIG. 1, the other equipment 28 represents additional components that utilize the central system 26. Such components may include specialized apparatus such as an authentication server that performs authentication to multiple local systems 24, logic that collects activity data from multiple local systems 24 and provides optimizations based on application of analytics to the activity data, and so on.

During operation, when a new user 22 wishes to obtain access to the local system 24(A), the local system 24(A) performs an initial setup (e.g., a registration or an enrollment process). To this end, the specialized local system circuitry 100(A) of the local system 24(A) receives user information (or input) 120 from the new user 22 and, in response to this input 120, creates a new local user entry 102(A) in the local user database 40(A).

For example, suppose that ABC Corporation is initially not a user of any of the systems of the electronic setting 20. Further suppose that ABC Corporation wishes to obtain IT services from the local system 24(A) and thus signs up to access the local system 24(A). To this end, the specialized local system circuitry 100(A) receives input 120(ABC) (e.g., "ABC CORP" perhaps along with other user description information) and creates, in the local user database 40(A), a new local user entry 102(A) that matches a local user identifier to ABC Corporation. By way of example, the specialized local system circuitry 100(A) creates the new local user entry 102(A) by assigning a local user identifier "ID1" to the user description "ABC CORP" to uniquely identify ABC Corporation using that local user identifier. It should be understood that, since the local system 24(A) will not reassign the identifier "ID1" to another user 22, the identifier "ID1" now uniquely identifies ABC Corporation to the local system 24(A). Accordingly, ABC Corporation is now properly configured to access the local system 24(A).

At some point, the local system 24(A) sends a user creation message 130 to the central system 26. Such an action may take place immediately, e.g., at the same time that the local system 24(A) adds the new local user entry 102(A) to the local user database 40(A). However, in the case of legacy systems, such an action may take place sometime after the local system 24(A) adds the new local user entry 102(A) to the local user database 40(A) (e.g., after the local system 24(A) has provided IT services to ABC Corporation for some time and during an update or integration operation to update the central system 26 with information from the local user database 40(A)).

The user creation message 130 includes a user description 132 and a set of aliases 134. The user description 132 describes a particular user 22 and may be the same user description from the local user entry 102(A) in the local user database 40(A) for that particular user 22. The set of aliases 134 informs the central system 26 of all of the existing user relationships for the particular user 22 that the local system 24(A) knows about (e.g., in some situations, another local system 24 may provide the local system 24(A) with such information).

Accordingly, in the above-identified example, the user description is "ABC CORP" and since the local system 24(A) does not know of ABC Corporation as being a user of any of other system of the electronic setting 20, the set of aliases 134 includes exactly one alias which is generated by the local system 24(A). By way of example, this alias 134 is "IT-ID1" where, when parsing the alias 134, "IT" is a local system identifier that uniquely identifies the local system 24(A) to the central system 26, "ID1" is the local user identifier that the local system 24(A) uses to uniquely identify ABC Corporation, and "-" is a delimiter that separates the local system identifier from the local user identifier. One should appreciate that since "IT" uniquely identifies the local system 24(A) to the central system 26 and since "ID1" is unique to the local system 24(A), the alias "IT:ID1" is unique within the electronic setting 20.

In response to the user creation message 130, the specialized central system circuitry 110 of the central system 26 performs a set of user identification normalization operations. In particular, the specialized central system circuitry 110 checks the alias database 44 to see if the central system 26 recognizes any aliases 134 in the user creation message 130. If so, the specialized central system circuitry 110 concludes that the particular user 22 already exists and simply augments the alias database 44 to recognize any aliases 134 that are not recognized (e.g., by adding one or more new alias entries 114 to the alias database 44). However, if the specialized central system circuitry 110 does not recognize any aliases 134 in the user creation message 130, the specialized central system circuitry 110 concludes that the user description 132 is for a new user 22 that is unknown to any of the systems of the electronic setting 20 and creates a new user entry 112 in the master user database 42 to identify that user to the central system 26. The specialized central system circuitry 110 then updates the alias database 44 to recognize all aliases 134 in the user creation message 130.

In the current example, the specialized central system circuitry 110 checks the alias database 44 for an alias entry 114 that includes the alias "IT-ID1" and does not find such an alias entry 114 in the alias database 44. Accordingly, the specialized central system circuitry 110 does not recognize the alias "IT-ID1", and then creates a new master user entry 112 in the master user database 42. In particular, the specialized central system circuitry 110 creates, in the master user database 42, a master user entry 112 that matches a master user identifier (e.g., "MasterID1") with the user description from the user creation message 130 ("ABC CORP") to identify the user 22. Accordingly, the master user identifier "MasterID1" uniquely identifies ABC Corporation to the central system 26.

After the specialized central system circuitry 110 adds this master user entry 112 to the master user database 42, the specialized central system circuitry 110 adds a new alias entry 114 to the alias database 44 that matches the alias "IT-ID1" to the master user identifier "MasterID1". As a result, if the central system 26 receives another user creation message 130 that includes the alias "IT-ID1", the central system 26 will recognize the user creation message 130 as being for the user 22 that is uniquely identified by "MasterID1", namely, ABC Corporation.

At this point, it should be understood that the local systems 24 may communicate collaboratively with each other and that there may be instances where a new user 22 signs up with multiple local systems 24(A) at the same time. For example, suppose that XYZ Corporation wishes to access desktop services from a local system 24(B) and that such access requires signing up for IT services from the local system 24(A). Here, XYZ Corporation provides input 120 (XYZ) to the local system 24(B). The input 120(XYZ) may include an organization name such as "XYZ CORP" perhaps along with other user description information (e.g., an address, contact info, etc.).

However, before the local system 24(B) signs up XYZ Corporation locally, the local system 24(B) sends communications 140 to the local system 24(A) enabling the local system 24(A) to coordinate creation of a new user XYZ Corporation. The communications 140 may include a copy of the input 120(XYZ) from XYZ Corporation.

In response to the communication 140, the specialized local system circuitry 100(A) of the local system 24(A) creates, in the local user database 40(A), another new local user entry 102(A) that matches a local user identifier to XYZ Corporation. For example, the specialized local system circuitry 100(A) creates the new local user entry 102(A) by assigning a local user identifier "ID2" to the user description "XYZ CORP" to uniquely identify XYZ Corporation using that local user identifier. Accordingly, XYZ Corporation is now properly configured to access the local system 24(A).

The local system 24(A) then sends another user creation message 130 which includes a user description 132 and a set of aliases 134. In this user creation message 130, the user description is "XYZ CORP" and since the local system 24(A) does not know of XYZ Corporation as being a user of any of other system of the electronic setting 20, the set of aliases 134 includes exactly one alias. Again, by way of example, this alias 134 is "IT-ID2" where, when parsing the alias 134, "IT" is the local system identifier that uniquely identifies the local system 24(A) to the central system 26, "ID2" is the local user identifier that the local system 24(A) uses to uniquely identify XYZ Corporation, and "-" is a delimiter that separates the local system identifier from the local user identifier.

In response to this user creation message 130, the specialized central system circuitry 110 of the central system 26 performs a set of user identification normalization operations. Again, the specialized central system circuitry 110 checks the alias database 44 to see if the central system 26 recognizes any aliases 134 in the user creation message 130. If so, the specialized central system circuitry 110 concludes that the particular user 22 already exists and simply augments the alias database 44 to recognize any aliases 134 that are not recognized (e.g., by adding one or more new alias entries 114 to the alias database 44). However, if the specialized central system circuitry 110 does not recognize any aliases 134 in the user creation message 130, the specialized central system circuitry 110 concludes that the user description 132 is for a new user 22 that is unknown to any of the systems of the electronic setting 20 and creates a new user entry 112 in the master user database 42 to identify that user to the central system 26. The specialized central system circuitry 110 then updates the alias database 44 to recognize all aliases 134 in the user creation message 130.

For XYZ Corporation, the specialized central system circuitry 110 checks the alias database 44 for an alias entry 114 that includes the alias "IT-ID2" and does not find such an alias entry 114 in the alias database 44. Thus, the specialized central system circuitry 110 does not recognize the alias "IT-ID2", and then creates a new master user entry 112 that matches a master user identifier (e.g., "MasterID2") with the user description from the user creation message 130 ("XYZ CORP") to identify XYZ Corporation. Accordingly, the master user identifier "MasterID2" uniquely identifies XYZ Corporation to the central system 26.

After the specialized central system circuitry 110 adds this master user entry 112 to the master user database 42, the specialized central system circuitry 110 adds a new alias entry 114 to the alias database 44 that matches the alias "IT-ID2" to the master user identifier "MasterID2". As a result, if the central system 26 receives another user creation message 130 that includes the alias "IT-ID2", the central system 26 will recognize the user creation message 130 as being for the user 22 that is uniquely identified by "MasterID2", namely, XYZ Corporation.

At this point, the local system 24(A) provides an acknowledgement 142 to the local system 24(B) in response to the communications 140. In particular, the acknowledgement 142 includes the alias "IT-ID2" that the local system 24(A) provided to the central system 26 on behalf of XYZ Corporation thus informing the local system 24(B) of an alias 134 that the central system 26 is able to recognize as identifying XYZ Corporation.

In response to the acknowledgement 142 from the local system 24(A) and now that the local system 24(A) has updated the central system 26 so that the central system 26 can recognize XYZ Corporation, the local system 24(B) locally signs up XYZ Corporation. To this end, the specialized local system circuitry 100(B) of the local system 24(B) creates, in the local user database 40(B), a new local user entry 102(B) that matches a local user identifier to XYZ Corporation. For example, the specialized local system circuitry 100(B) creates the new local user entry 102(B) by assigning a local user identifier "#1" to the user description "XYZ CORP" to uniquely identify XYZ Corporation using that local user identifier. Accordingly, XYZ Corporation is now properly configured to access the local system 24(B).

The local system 24(B) then sends a user creation message 130 which includes a user description 132 and a set of aliases 134. In this user creation message 130, the user description is "XYZ CORP" and the set of aliases 134 includes two aliases: the alias "IT-ID2" generated by the local system 24(A) and the alias "DT-#1" generated by the local system 24(B). It should be understood that the alias "DT-#1", when parsed, includes "DT" as a local system identifier to uniquely identify the local system 24(B) to the central system 26, "#1" which is the local user identifier that the local system 24(B) uses to uniquely identify XYZ Corporation, and "-" which is a delimiter that separates the local system identifier from the local user identifier.

In response to this user creation message 130, the specialized central system circuitry 110 of the central system 26 performs the set of user identification normalization operations. Along these lines, the specialized central system circuitry 110 of the central system 26 checks the alias database 44 to see if the central system 26 recognizes any aliases 134 in the user creation message 130. In this situation, the specialized central system circuitry 110 concludes that the particular user 22 already exists because the user creation message 130 includes the alias "IT-ID2", and an alias entry 114 containing the alias "IT-ID2" already exists in the alias database 44. Specifically, the specialized central system circuitry 110 queries the alias database 44 and finds the alias entry 114 that matches the alias "IT-ID2" to the master user identifier "MasterID2".

Next, the specialized central system circuitry 110 updates the alias database 44 to recognize any aliases 134 that are not recognized (e.g., by adding one or more new alias entries 114 to the alias database 44). In particular, the specialized central system circuitry 110 adds a new alias entry 114 to the alias database 44 that matches the alias "DT-#1" to the master user identifier "MasterID2". As a result, if the central system 26 receives another user creation message 130 that includes the alias "DT-#1", the central system 26 will recognize the user creation message 130 as being for the user 22 that is uniquely identified by "MasterID2", namely, XYZ Corporation.

At this point, one should appreciate that the central system 26 is now able to identify XYZ Corporation across multiple local systems 24 even though the local systems 24 utilize disparate user identification techniques. Accordingly, the central system 26 advantageously provides normalization of user identification. At this point, the electronic setting 20 may perform operations that leverage off of such normalization such as unified authentication, big data analytics, and so on (see the arrow 150 in FIG. 3 indicating further communications with the other equipment 28).

One should further appreciate that the process of adding ABC Corporation and XYZ Corporation to the central system 26 may be in immediate response to their registration as new users 22 to the local systems 24. Alternatively, ABC Corporation and/or XYZ Corporation may have been existing users 22 of one or more local systems 24 for some time and the existing users 22 are added as part of a legacy system integration process. Further details will now be provided with reference to the other Figures.

Figure 4:
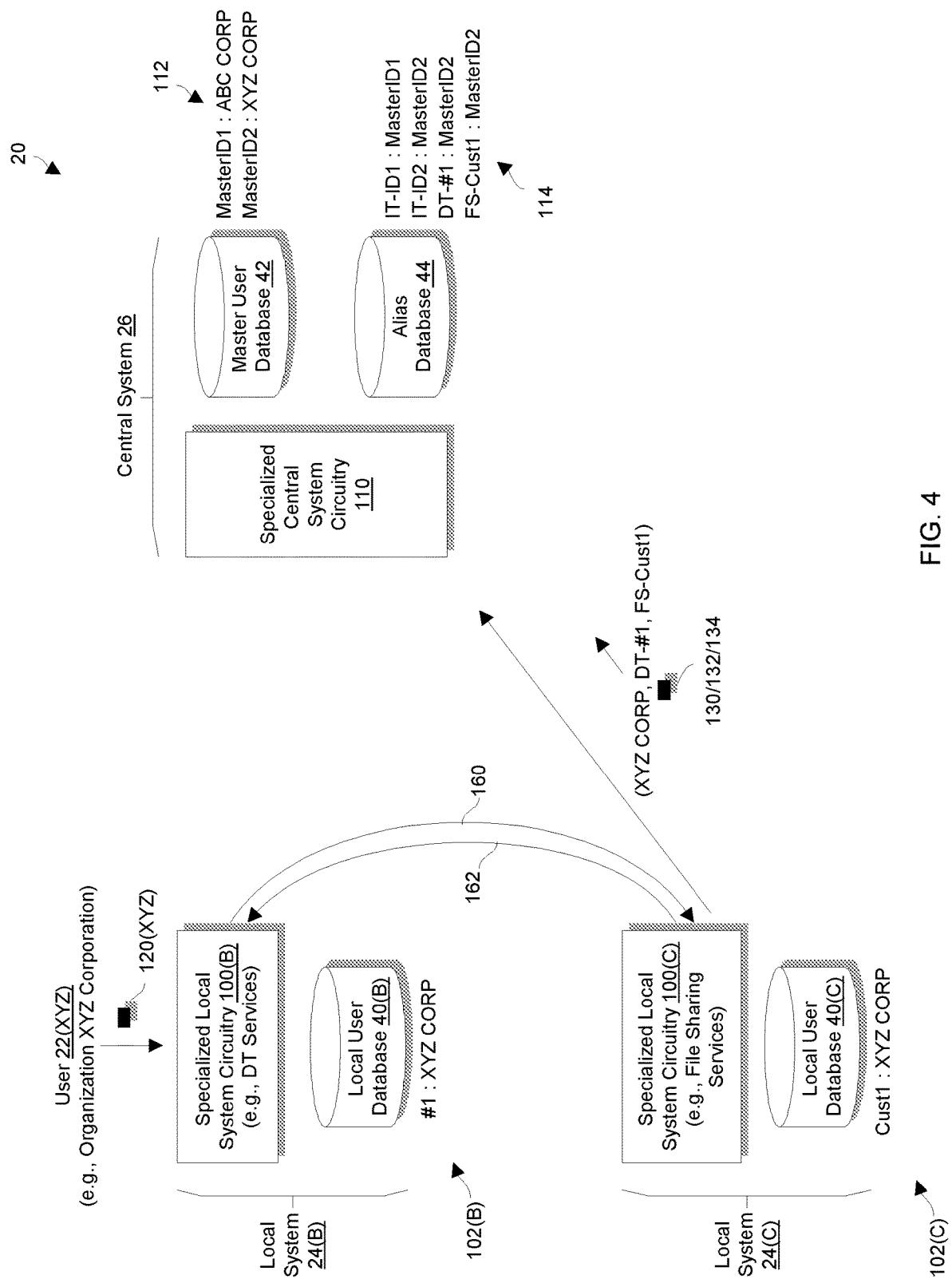
FIG. 4 is a block diagram illustrating a second normalization operation in accordance with certain embodiments.

FIG. 4 shows a situation in which an existing user 22 of a local system 24 further signs up for specialized products and/or services from another local system 24. By way of example, suppose that XYZ Corporation now wishes to access file sharing services (e.g. document uploading and sharing over a network, document synchronization, other document-centric tasks, etc.) from another local system 24(C) which specializes in providing file sharing services.

To this end, while XYZ Corporation is using the local system 24(B) to access desktop services, XYZ Corporation directs the local system 24(B) to sign up for file sharing services on the local system 24(C) (see the user input 120(XYZ) in FIG. 4). In response, the local system 24(B) sends a communication 160 to the local system 24(C). The communication 160 includes the user description "XYZ CORP" along with the alias "DT-#1" that the local system 24(B) had previously generated and provided to the central system 26.

In response to the communication 160, the local system 24(C) locally signs up XYZ Corporation. To this end, the specialized local system circuitry 100(C) of the local system 24(C) creates, in the local user database 40(C), a new local user entry 102(C) that matches a local user identifier to XYZ Corporation. For example, the specialized local system circuitry 100(C) creates the new local user entry 102(C) by assigning a local user identifier "Cust1" to the user description "XYZ CORP" to uniquely identify XYZ Corporation using that local user identifier. Accordingly, XYZ Corporation is now properly configured to access file sharing services from the local system 24(C).

The local system 24(C) then sends a user creation message 130 which includes a user description 132 and a set of aliases 134. In this user creation message 130, the user description is "XYZ CORP" and the set of aliases 134 includes two aliases: the alias "DT-#1" generated by the local system 24(B) and the alias "FS-Cust1" generated by the local system 24(C). It should be understood that the alias "FS-Cust1", when parsed, includes "FS" as a local system identifier to uniquely identify the local system 24(C) to the central system 26, "Cust1" which is the local user identifier that the local system 24(C) uses to uniquely identify XYZ Corporation, and "-" which is a delimiter that separates the local system identifier from the local user identifier.

In response to this user creation message 130, the specialized central system circuitry 110 of the central system 26 performs the set of user identification normalization operations. Along these lines, the specialized central system circuitry 110 of the central system 26 checks the alias database 44 to see if the central system 26 recognizes any aliases 134 in the user creation message 130. In this situation, the specialized central system circuitry 110 concludes that the particular user 22 already exists because the user creation message 130 includes the alias "DT-#1", and an alias entry 114 containing the alias "DT-#1" already exists in the alias database 44. Specifically, the specialized central system circuitry 110 queries the alias database 44 and finds the alias entry 114 that matches the alias "DT-#1" to the master user identifier "MasterID2".

Next, the specialized central system circuitry 110 updates the alias database 44 to recognize any aliases 134 that are not recognized in the set of aliases 134 (e.g., by adding one or more new alias entries 114 to the alias database 44). In this situation, the specialized central system circuitry 110 adds a new alias entry 114 to the alias database 44 that matches the alias "FS-Cust1" to the master user identifier "MasterID2". As a result, if the central system 26 receives another user creation message 130 that includes the alias "DT-#2", the central system 26 will recognize the user creation message 130 as being for the user 22 that is uniquely identified by "MasterID2" which is XYZ Corporation. To confirm completion, the local system 24(C) may send a communication 162 back to the local system 24(B).

As shown in FIG. 4, the local system 24(B) communicated with the local system 24(C) to add a new user 22 to the local system 24(C) as well as update the central system 26. It should be understood that similar activity may occur in the reverse direction as well.

Figure 5:
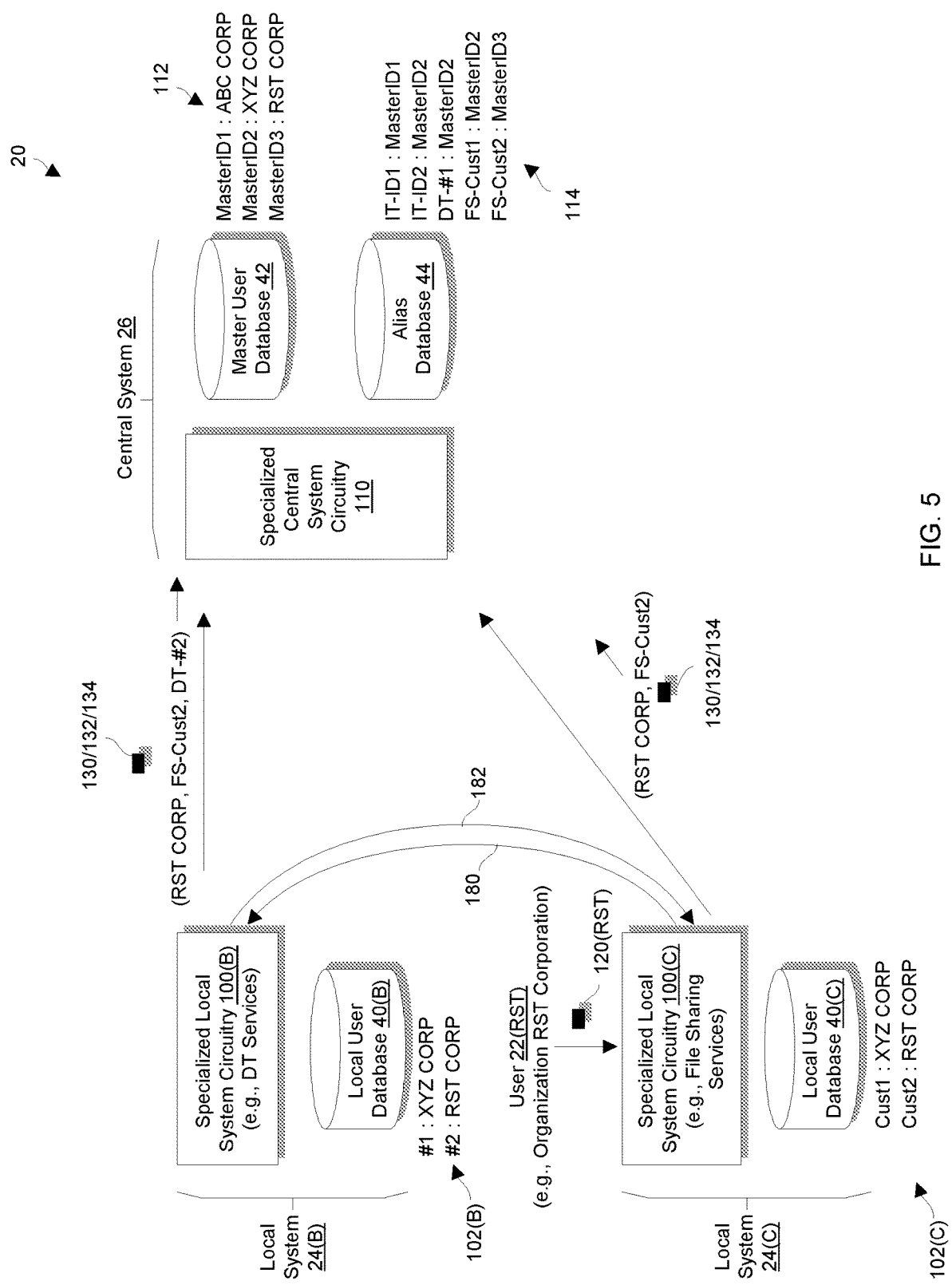
FIG. 5 is a block diagram illustrating a third normalization operation in accordance with certain embodiments.

FIG. 5 shows a situation in which the local system 24(C) initially creates a new user 22 locally and informs the central system 26, and then communicates with the local system 24(B) so that the local system 24(B) creates a new user 22 locally as well as informs the central system 26. In particular, suppose that RST Corporation wishes to obtain both file sharing services from the local system 24(C) and desktop services from the local system 24(B).

During signup, RST Corporation signs up as a new user 22(RST) with the local system 24(C). To this end, specialized local system circuitry 100(C) of the local system 24(C) receives input 120(RST) from RST Corporation. In response to the input 120(RST), the specialized local system circuitry 100(C) locally signs up RST Corporation. To this end, the specialized local system circuitry 100(C) of the local system 24(C) creates, in the local user database 40(C), a new local user entry 102(C) that matches a local user identifier to RST Corporation. For example, the specialized local system circuitry 100(C) creates the new local user entry 102(C) by assigning a local user identifier "Cust2" to the user description "RST CORP" to uniquely identify RST Corporation using that local user identifier. Accordingly, RST Corporation is now properly configured to access the local system 24(C).

The local system 24(C) 2'1(B) then sends a user creation message 130 which includes a user description 132 and a set of aliases 134. In this user creation message 130, the user description is "RST CORP" and the set of aliases 134 includes exactly one alias, "FS-Cust2" generated by the local system 24(C). It should be understood that the alias "FS-Cust2", when parsed, includes "FS" as a local system identifier to uniquely identify the local system 24(C) to the central system 26, "Cust2" which is the local user identifier that the local system 24(C) uses to uniquely identify RST Corporation, and "-" which is a delimiter that separates the local system identifier from the local user identifier.

In response to this user creation message 130, the specialized central system circuitry 110 of the central system 26 performs the set of user identification normalization operations. Along these lines, the specialized central system circuitry 110 of the central system 26 checks the alias database 44 to see if the central system 26 recognizes any aliases 134 in the user creation message 130. In this situation, the specialized central system circuitry 110 concludes that the particular user 22 does not yet exist because the alias "FS-Cust2" does not reside in any of the alias entries 114 in the alias database 44.

In response to not recognizing the alias "FS-Cust2", the specialized central system circuitry 110 of the central system 26 creates a new master user entry 112 in the master user database 42. In particular, the specialized central system circuitry 110 creates, in the master user database 42, a master user entry 112 that matches a new master user identifier (e.g., "MasterID3") with the user description from the user creation message 130 ("RST CORP") to identify the user 22. Accordingly, the master user identifier "MasterID3" uniquely identifies RST Corporation to the central system 26.

After the specialized central system circuitry 110 adds this master user entry 112 to the master user database 42, the specialized central system circuitry 110 adds a new alias entry 114 to the alias database 44 that matches the alias "FS-Cust2" to the master user identifier "MasterID3". As a result, if the central system 26 receives another user creation message 130 that includes the alias "FS-Cust2", the central system 26 will recognize the user creation message 130 as being for the user 22 that is uniquely identified by "MasterID3", namely, RST Corporation.

Upon updating the central system 26, the local system 24(C) communicates with the local system 24(B) to enable RST Corporation (i.e., the user 22(RST)) to receive desktop services. In particular, the local system 24(C) sends a communication 180 which includes the user description "RST CORP" and the alias "FS-Cust2" to the local system 24(B).

In response to the communication 180 from the local system 24(C) and now that the local system 24(C) has updated the central system 26 so that the central system 26 can recognize RST Corporation, the local system 24(B) locally signs up RST Corporation. To this end, the specialized local system circuitry 100(B) of the local system 24(B) creates, in the local user database 40(B), a new local user entry 102(B) that matches a local user identifier to RST Corporation. For example, the specialized local system circuitry 100(B) creates the new local user entry 102(B) by assigning a local user identifier "#2" to the user description "RST CORP" to uniquely identify RST Corporation using that local user identifier. Accordingly, RST Corporation is now properly configured to access the local system 24(B).

The local system 24(B) then sends a user creation message 130 which includes a user description 132 and a set of aliases 134. In this user creation message 130, the user description is "RST CORP" and the set of aliases 134 includes two aliases: the alias "FS-Cust2" generated by the local system 24(C) and the alias "DT-#2" generated by the local system 24(B). It should be understood that the alias "DT-#2", when parsed, includes "DT" as a local system identifier to uniquely identify the local system 24(B) to the central system 26, "#2" which is the local user identifier that the local system 24(B) uses to uniquely identify RST Corporation, and "-" which is a delimiter that separates the local system identifier from the local user identifier.

In response to this user creation message 130, the specialized central system circuitry 110 of the central system 26 performs the set of user identification normalization operations. Along these lines, the specialized central system circuitry 110 of the central system 26 checks the alias database 44 to see if the central system 26 recognizes any aliases 134 in the user creation message 130. In this situation, the specialized central system circuitry 110 concludes that the particular user 22 already exists because the user creation message 130 includes the alias "FS-Cust2", and an alias entry 114 containing the alias "FS-Cust2" already exists in the alias database 44. Specifically, the specialized central system circuitry 110 queries the alias database 44 and finds the alias entry 114 that matches the alias "FS-Cust2" to the master user identifier "MasterID3".

Next, the specialized central system circuitry 110 updates the alias database 44 to recognize any aliases 134 that are not recognized in the set of aliases 134 (e.g., by adding one or more new alias entries 114 to the alias database 44). In this situation, the specialized central system circuitry 110 adds a new alias entry 114 to the alias database 44 that matches the alias "DT-#2" to the master user identifier "MasterID3". As a result, if the central system 26 receives another user creation message 130 that includes the alias "DT-#2", the central system 26 will recognize the user creation message 130 as being for the user 22 that is uniquely identified by "MasterID3" which is RST Corporation. To confirm completion, the local system 24(B) may send a communication 182 back to the local system 24(C).

It should be understood that while the various users 22 access the local systems 24 to obtain products and/or services, the central system 26 is able to normalize user identification by virtue of its master user database 42 and alias database 44. In particular, the local systems 24 may send a variety of messages 62 (e.g., also see FIG. 1) that include locally generated aliases 134 to the central system 26. The central system 26 is then able to properly identify each user 22 based on recognizing the aliases 134 within the messages 62.

Figure 6:
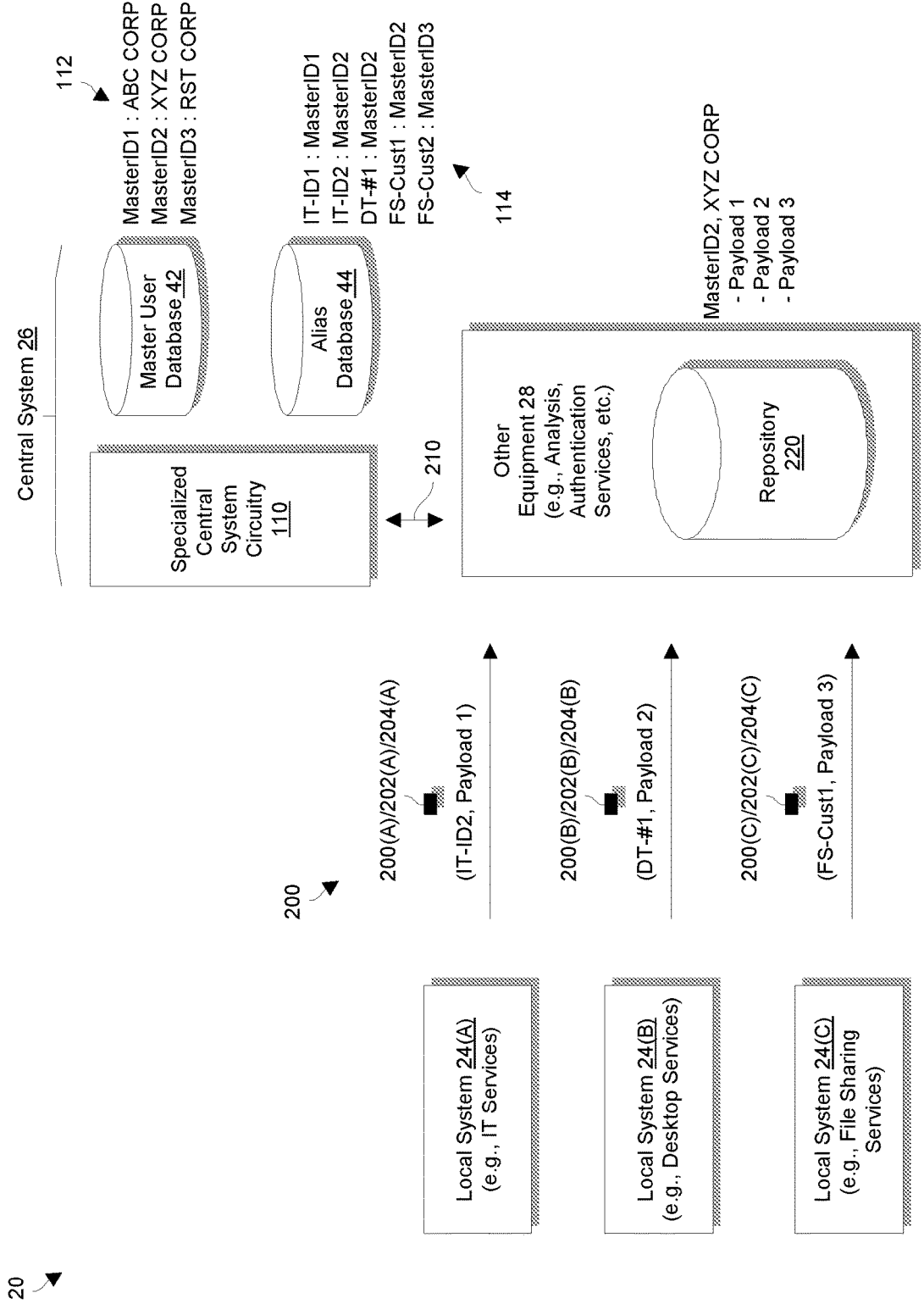
FIG. 6 is a block diagram illustrating a fourth normalization operation in accordance with certain embodiments.

FIG. 6 shows a collaborative situation in which each of local system 24(A), local system 24(B), and local system 24(C) sends messages 200 to the central system 26 to consistently identify a particular user 22. In particular, the local system 24(A) sends messages 200(A) to the equipment 28 that include an alias 202(A) (e.g., "IT-ID2") and a payload 204(A) (e.g., activity data from the local system 24(A)). Similarly, the local system 24(B) sends messages 200(B) to the equipment 28 that include an alias 202(B) (e.g., "DT-#1") and a payload 204(B) (e.g., activity data from the local system 24(B)). Likewise, the local system 24(C) sends messages 200(C) to the equipment 28 that include an alias 202(C) (e.g., "FS-Cust1") and a payload 204(C) (e.g., activity data from the local system 24(C)).

Although it may superficially appear that the messages 200(A), 200(B), 200(C) are for different users 22, the equipment 28 communicates with the central system 26 via messages 210 to identify all of the messages as pertaining to XYZ Corporation. In particular, each alias 202(A), 202(B), 202(C) is different but matches with the same master user identifier, MasterID2, in the alias database 44. Accordingly, the central system 26 is then able to determine, according to the user description XYZ Corp that matches MasterID2 in the master user database 42, that the user 22 is XYZ Corporation.

By ways of example, with the user 22 accurately identified, the equipment 28 is able to perform useful work such as collecting the payloads 204(A), 204(B), 204(C) for the same user 22 in a repository 220, perform analysis across all of the data, and so on. Thus, due to robust and reliable normalization of user identification provided by the central system 26, the equipment 28 is able to process messages 200 and perform useful work for the same user 22 even though the messages 200 are from the disparate local systems 24. Further details will now be provided with reference to FIG. 7.

Figure 7:
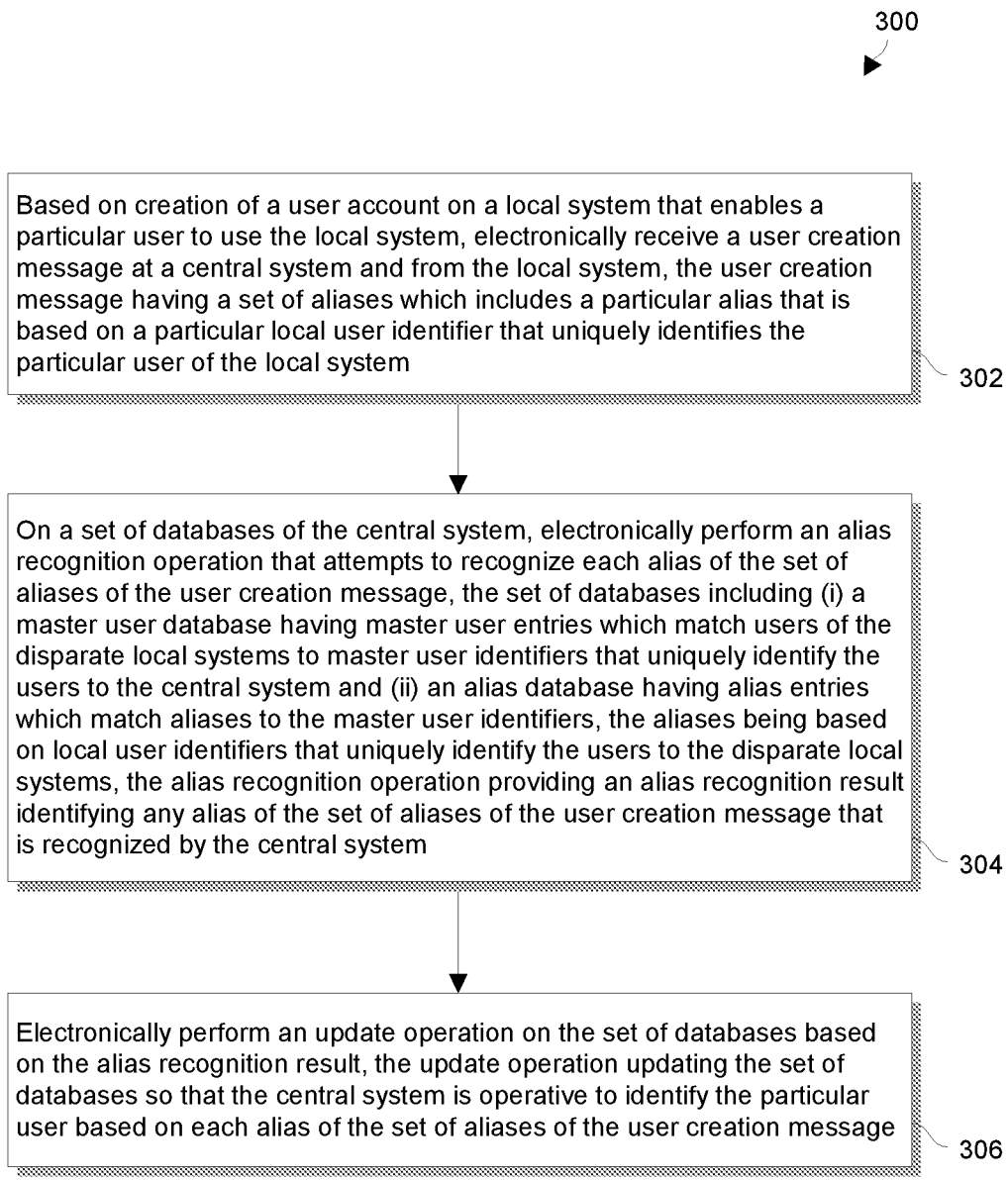
FIG. 7 is a flowchart of a procedure that is performed by the electronic setting of FIG. 1.

FIG. 7 is a flowchart of a procedure 300 that is performed by a central system of an electronic setting when normalizing user identification. Such user identification normalization enables information from different local systems to be properly associated with the same user even if the user is identified by each local system via a different identification technique.

At 302, based on creation of a user account on a local system that enables a particular user to use a local system, the central system electronically receives a user creation message from the local system. The user creation message has a set of aliases which includes a particular alias that is based on a particular local user identifier that uniquely identifies the particular user to the local system. For example, see the user creation messages 130 in FIGS. 3 through 5.

At 304, on a set of databases, the central system electronically performs an alias recognition operation that attempts to recognize each alias of the set of aliases of the user creation message. The set of databases includes (i) a master user database having master user entries which match users of the disparate local systems to master user identifiers that uniquely identify the users to the central system and (ii) an alias database having alias entries which match aliases to the master user identifiers. The aliases are based on local user identifiers that uniquely identify the users to the disparate local systems. The alias recognition operation provides an alias recognition result identifying any alias of the set of aliases of the user creation message that is recognized by the central system. For example, see the master user database 42 and the alias database 44 in FIGS. 3 through 6.

At 306, the central system electronically performs an update operation on the set of databases based on the alias recognition result. The update operation updates the set of databases so that the central system is operative to identify the particular user based on each alias of the set of aliases of the user creation message. For example, see entries 112, 114 in FIGS. 3 through 6.

As described above, improved techniques are directed to normalizing identification of users 22 across disparate local systems 24. Such normalization of user identification enables a provider to accurately ascertain a particular user 22 of multiple disparate local systems 24 even when the multiple disparate local systems 24 identify the user via different identification schemes. Accordingly, the provider is able to offer improved support to that user 22 across the multiple disparate local systems 24. For example, with such normalization of user identification, the provider may employ a single authentication system across the various local systems 24 thus enabling users 22 to authenticate via the same authentication process regardless of which local systems 24 the users 22 attempt to access. As another example, the provider may collect user data among the disparate local systems 24 and apply analytics to identify optimization opportunities for the users 22 that could not be otherwise be conveniently determined.

Additionally, one should appreciate that this above-described techniques amount to more than simply mapping data. Rather, the techniques involve an improvement to the technology of normalizing user identification across disparate local systems 24. As a result, information from different local systems 24 can be properly associated with the same user 22 even if that user 22 is identified by each local system 24 via a different identification technique.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the other equipment 28 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

It should be understood that the above-described user identification normalization techniques do not force separation of resources due to the fact they are coming from different cloud services. Furthermore, such normalization allows cloud services to provide custom actions on an object that can be separately implemented and called centrally.

It should be further understood that, in connection with conventional approaches, a barrier to providing unified services that depend on customer context across disparate products is that each product has its own definition of the customer in disparate systems. Forcing each product to have a common definition is very costly for existing products that already have a definition in place. In addition, existing products that need to integrate with the unified services in the future would need to adapt to the common definition.

However, with the improvements described herein, a central system is able to create correlations by using the data known by the systems. In some embodiments, the central system utilizes user-aliases. Products and/or services deployed within an electronic setting provide the central system all the information they currently know about the customer and the central system learns which aliases are associated with each user. These aliases then become linked with a centralized object. Products and/or services can then continue to use their local identifier for the user or choose to use the central reference. Products and/or services cooperating in the collective experience can find a user by its global identifier, the identifier of an unknown system or the reference in the local system.

It should be understood that such loose coupling accelerates the product's and service's abilities to join the collective by removing friction. For example, legacy systems are easily integrated with newer systems regardless of identification technique. Such modifications and enhancements are intended to belong to various embodiments of the disclosure.

What is claimed is:

1. A method of normalizing user identification across disparate local systems, the method comprising:
    based on creation of a user account on a local system that enables a particular user to use the local system, electronically receiving a user creation message at a central system and from the local system, the user creation message having a set of aliases which includes a particular alias that includes (i) a particular local user identifier that uniquely identifies the particular user to the local system, and (ii) a particular local system identifier that uniquely identifies the local system, wherein the particular local user identifier and the particular local system identifier are generated by the local system;
    on a set of databases of the central system, electronically performing an alias recognition operation that attempts to recognize each alias of the set of aliases of the user creation message, the set of databases including (i) a master user database having master user entries which match users of the disparate local systems to master user identifiers that uniquely identify the users to the central system, wherein the master user identifiers are generated by the central system, and (ii) an alias database having alias entries which match stored aliases to the master user identifiers, the stored aliases being based on local user identifiers that uniquely identify the users to the disparate local systems, the alias recognition operation providing an alias recognition result identifying any alias of the set of aliases of the user creation message that is recognized by the central system; and
    electronically performing an update operation on the set of databases based on the alias recognition result, the update operation updating the set of databases so that the central system is operative to identify the particular user based on each alias of the set of aliases of the user creation message.

2. The method of claim 1, further comprising:
    collecting usage data from each of the disparate local systems, the usage data identifying activities performed by the disparate local systems on behalf of the users; and
    based on the usage data collected from each of the disparate local systems, deriving a set of optimizations to perform on the disparate local systems.

3. The method of claim 1, further comprising:
    collecting usage data from first and second ones of the disparate local systems, the usage data identifying activities performed by the first and second disparate local systems on behalf of the users; and
    automatically adjusting operation of the first disparate local system based on usage data that identifies activities performed by the second disparate local system.

4. The method of claim 1, wherein the users are different organizations that utilize respective sets of cloud services provided by the disparate local systems, each disparate local system being operative to provide a different cloud service to the different organizations.

5. The method of claim 1, wherein the particular user uses a set of services provided by the disparate local systems, each disparate local system being operative to provide a different service to the particular user.

6. The method of claim 1, wherein:
    the particular user is an organization;
    prior to electronically performing the update operation, the central system prevented human workers belonging to the organization from using the local system due to improper authentication but allowed the human workers belonging to the organization to use another local system of the disparate local systems due to proper authentication; and
    the method further comprises, based on electronically performing the update operation, allowing the human workers belonging to the organization to use the local system due to proper authentication.

7. The method of claim 1, wherein electronically receiving the user creation message further includes obtaining, within the set of aliases of the user creation message, the particular local system identifier and an additional local system identifier which uniquely identifies another one of the disparate local systems.

8. The method of claim 1, wherein:
    electronically receiving the user creation message includes obtaining, as part of the user creation message, a particular user description that describes the particular user; and
    when electronically performing the update operation on the set of databases, the central system is operative to:
        when the alias recognition result identifies no alias of the set of aliases of the user creation message as being recognized by the central system, perform a new user operation that (i) adds a new master user entry to the master user database, the new master user entry matching a new master user identifier to the particular user description that describes the particular user and (ii) adds a first set of new alias entries to the alias database, the first set of new alias entries matching each alias of the set of aliases of the user creation message to the new master user identifier, and
        when the alias recognition result identifies the particular alias as being recognized by the central system, perform an existing user operation that (i) retrieves an existing master user identifier from an existing alias entry of the alias database based on the particular alias that is recognized by the central system, and (ii) adds a second set of new alias entries to the alias database, the second set of new alias entries matching each unrecognized alias of the set of aliases of the user creation message to the existing master user identifier retrieved from the existing alias entry.

9. The method of claim 8, wherein:
    the new master user identifier is generated by the central system.

10. The method of claim 8, wherein:
the existing master user identifier is generated by the central system.

11. The method of claim 8, wherein:
the set of aliases of the user creation message includes exactly one alias, the exactly one alias being the particular alias; and
adding the first set of new alias entries to the alias database includes, based on the exactly one alias, creating exactly one new entry in the alias database, the exactly one new entry matching the exactly one alias to the new master user identifier that is generated by the central system.

12. A computer program product having a non-transitory computer readable medium that stores a set of instructions to normalize user identification across disparate local systems, the set of instructions, when carried out by computerized circuitry, causing the computerized circuitry to perform a method of:
based on creation of a user account on a local system that enables a particular user to use the local system, electronically receiving a user creation message at a central system and from the local system, the user creation message having a set of aliases which includes a particular alias that is based on a particular local user identifier that uniquely identifies the particular user to the local system, the particular user being an organization;
on a set of databases of the central system, electronically performing an alias recognition operation that attempts to recognize each alias of the set of aliases of the user creation message, the set of databases including (i) a master user database having master user entries which match users of the disparate local systems to master user identifiers that uniquely identify the users to the central system and (ii) an alias database having alias entries which match stored aliases to the master user identifiers, the stored aliases being based on local user identifiers that uniquely identify the users to the disparate local systems, the alias recognition operation providing an alias recognition result identifying any alias of the set of aliases of the user creation message that is recognized by the central system; and
electronically performing an update operation on the set of databases based on the alias recognition result, the update operation updating the set of databases so that the central system is operative to identify the particular user based on each alias of the set of aliases of the user creation message.

13. The computer program product of claim 12, wherein:
electronically receiving the user creation message includes obtaining, as part of the user creation message, a particular user description that describes the particular user; and
when electronically performing the update operation on the set of databases, the central system is operative to:
when the alias recognition result identifies no alias of the set of aliases of the user creation message as being recognized by the central system, perform a new user operation that (i) adds a new master user entry to the master user database, the new master user entry matching a new master user identifier to the particular user description that describes the particular user and (ii) adds a set of new alias entries to the alias database, the set of new alias entries matching each alias of the set of aliases of the user creation message to the new master user identifier, and
when the alias recognition result identifies the particular alias as being recognized by the central system, perform an existing user operation that (i) retrieves an existing master user identifier from an existing alias entry of the alias database based on the particular alias that is recognized by the central system, and (ii) adds a set of new alias entries to the alias database, the set of new alias entries matching each unrecognized alias of the set of aliases of the user creation message to the existing master user identifier retrieved from the existing alias entry.

14. The computer program product of claim 12, wherein electronically receiving the user creation message further includes obtaining, as each alias of the set of aliases of the user creation message, a local system identifier which uniquely identifies one of the disparate local systems.

15. The computer program product of claim 12, wherein electronically receiving the user creation message includes obtaining, as the particular alias, an identifier combination created by the local system, the identifier combination including the particular local user identifier combined with a local system identifier that uniquely identifies the local system among the disparate local systems.

16. An electronic apparatus that normalizes user identification across disparate local systems, the apparatus comprising:
a communications interface;
memory; and
control circuitry coupled to the communications interface and the memory, the memory storing instructions that, when carried out by the control circuitry, cause the control circuitry to:
based on creation of a user account on a local system that enables a particular user to use the local system, electronically receive a user creation message at a central system and from the local system, the user creation message having a set of aliases which includes (i) a first alias comprising a first local user identifier that uniquely identifies the particular user to the local system, and (ii) a second alias comprising a second local user identifier that uniquely identifies the particular user to a different local system;
on a set of databases of the central system, electronically perform an alias recognition operation that attempts to recognize each alias of the set of aliases of the user creation message, the set of databases including (i) a master user database having master user entries which match users of the disparate local systems to master user identifiers that uniquely identify the users to the central system and (ii) an alias database having alias entries which match stored aliases to the master user identifiers, the stored aliases being based on local user identifiers that uniquely identify the users to the disparate local systems, the alias recognition operation providing an alias recognition result identifying any alias of the set of aliases of the user creation message that is recognized by the central system; and
electronically perform an update operation on the set of databases based on the alias recognition result, the update operation updating the set of databases so that the central system is operative to identify the particular user based on each alias of the set of aliases of the user creation message.

17. The electronic apparatus of claim 16, wherein:
electronically receiving the user creation message includes obtaining, as part of the user creation message, a particular user description that describes the particular user; and
when electronically performing the update operation on the set of databases, the central system is operative to:
when the alias recognition result identifies no alias of the set of aliases of the user creation message as being recognized by the central system, perform a new user operation that (i) adds a new master user entry to the master user database, the new master user entry matching a new master user identifier to the particular user description that describes the particular user and (ii) adds a set of new alias entries to the alias database, the set of new alias entries matching each alias of the set of aliases of the user creation message to the new master user identifier, and
when the alias recognition result identifies the first alias as being recognized by the central system, perform an existing user operation that (i) retrieves an existing master user identifier from an existing alias entry of the alias database based on the first alias that is recognized by the central system, and (ii) adds a set of new alias entries to the alias database, the set of new alias entries matching each unrecognized alias of the set of aliases of the user creation message to the existing master user identifier retrieved from the existing alias entry.

18. The electronic apparatus of claim 16, wherein electronically receiving the user creation message further includes obtaining, as each alias of the set of aliases of the user creation message, a local system identifier which uniquely identifies one of the disparate local systems.

19. The electronic apparatus of claim 16, wherein the particular user uses a set of services provided by the disparate local systems, each disparate local system being operative to provide a different service to the particular user.

20. The electronic apparatus of claim 16, wherein electronically receiving the user creation message includes obtaining, as the first alias, an identifier combination created by the local system, the identifier combination including the first local user identifier combined with a local system identifier that uniquely identifies the local system among the disparate local systems.

* * * * *